US012707015B2

(12) United States Patent
Mori

(10) Patent No.: US 12,707,015 B2
(45) Date of Patent: Aug. 11, 2026

(54) IMAGE FORMING APPARATUS AND USER REGISTRATION METHOD FOR ALLOWING RESTRICTION OF REUSE OF A LOGIN NAME

(71) Applicant: SHARP KABUSHIKI KAISHA, Sakai City (JP)

(72) Inventor: Harunobu Mori, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 215 days.

(21) Appl. No.: 18/202,614

(22) Filed: May 26, 2023

(65) Prior Publication Data

US 2023/0388433 A1 Nov. 30, 2023

(30) Foreign Application Priority Data

May 30, 2022 (JP) ................................ 2022-087957

(51) Int. Cl.
*H04N 1/44* (2006.01)
*G06F 21/45* (2013.01)

(52) U.S. Cl.
CPC ........... *H04N 1/4413* (2013.01); *G06F 21/45* (2013.01); *G06F 2221/2117* (2013.01); *H04N 2201/0094* (2013.01)

(58) Field of Classification Search
CPC .......... H04N 1/4413; H04N 2201/0094; G06F 21/45; G06F 2221/2117
USPC ............................................................ 726/16
See application file for complete search history.

(56) References Cited

U.S. PATENT DOCUMENTS 9,166,961 B1 * 10/2015 Johansson ............. H04L 63/102
2009/0083843 A1 * 3/2009 Wilkinson, Jr. ...... H04L 9/3234 726/9
2010/0014652 A1 * 1/2010 Yasuda .................. H04M 3/36 379/196
2011/0185404 A1 * 7/2011 DeCusatis .............. G06F 21/31 711/163
2022/0300630 A1 * 9/2022 Singh ................. G06F 21/6218
2022/0303768 A1 * 9/2022 Balasubramanian ........................ H04W 12/06

FOREIGN PATENT DOCUMENTS

EP 3792798 A1 * 3/2021 ........... H04L 63/083
JP H066455 A 1/1994
WO WO-2007095326 A2 * 8/2007 ......... G06Q 30/0641

* cited by examiner

*Primary Examiner* — Bryan F Wright
(74) *Attorney, Agent, or Firm* — ScienBiziP, P.C.

(57) ABSTRACT

In an image forming apparatus, personal identification information for identifying a user is associated with the user and as such registered. If a request for deletion of a registered user is received, whether to forbid reuse of the personal identification information, which is associated with the registered user for which the request for deletion is received, is determined. A request for registration of a user which a piece of personal identification information is associated with is refused in accordance with a determination to forbid reuse of the piece of personal identification information.

9 Claims, 12 Drawing Sheets

IMAGE FORMING APPARATUS AND USER REGISTRATION METHOD FOR ALLOWING RESTRICTION OF REUSE OF A LOGIN NAME

BACKGROUND OF THE INVENTION

Field of the Invention

The present disclosure relates to an image forming apparatus and a user registration method for an image forming apparatus.

Description of the Background Art

On a multifunction printer for business use, users are generally managed by performing user registration and user authentication before the users use the multifunction printer. Normally, a manager of the multifunction printer imparts a unique login name to each user. Registered users are different in login name from one another and, accordingly, two or more registered users never use the same login name.

In relation to the user management, a conventional technology has proposed a private branch exchange that monitors input related to personal identification information set to be in a use forbidden state. In the private branch exchange, the use forbidden state of the personal identification information is cancelled if an erroneous input of a password is not detected for a specified period with respect to the personal identification information set to be in the use forbidden state.

On a multifunction printer where registration and authentication of users are to be performed, a manager of the multifunction printer normally cancels the registration of a user if the user does not use the multifunction printer any longer. As a result of cancellation of the registration of the user, the login name of the user is not used by any existing user. Consequently, the login name in question is available to a user newly subjected to user registration. From the viewpoint of, for instance, user management or security, however, it may be undesirable that the same login name is used by a user other than the original user.

In the conventional private branch exchange as above, personal identification information in the use forbidden state means that the use of a function of the private branch exchange based on the personal identification information is forbidden, and does not mean that the use of the personal identification information itself is forbidden. According to the conventional technology, even the personal identification information in the use forbidden state is used for authentication.

An object of the present disclosure is to provide an image forming apparatus and a user registration method each allowing restriction of reuse of a login name.

SUMMARY OF THE INVENTION

An image forming apparatus according to the present disclosure includes: a register that registers, in association with a user, personal identification information for identifying the user; a reuse forbiddance determiner that determines, in response to reception of a request for deletion of a registered user, whether to forbid reuse of the personal identification information, which is associated with the registered user for which the request for deletion is received; and a user registration determiner that refuses a request for registration of a user which a piece of personal identification information is associated with, in accordance with a determination by the reuse forbiddance determiner to forbid reuse of the piece of personal identification information.

A user registration method for an image forming apparatus according to the present disclosure includes: registering, in association with a user, personal identification information for identifying the user; determining, in response to reception of a request for deletion of a registered user, whether to forbid reuse of the personal identification information, which is associated with the registered user for which the request for deletion is received; and refusing a request for registration of a user which a piece of personal identification information is associated with, in accordance with a determination to forbid reuse of the piece of personal identification information.

According to the present disclosure, an image forming apparatus and a user registration method each allowing restriction of reuse of a login name are provided.

DESCRIPTION OF THE PREFERRED EMBODIMENTS

In the following, embodiments for carrying out the present disclosure are described with reference to the drawings. The embodiments are each an example for describing the present disclosure, and the technical scope of the present disclosure as recited in the claims is not limited to the following description.

1. First Embodiment 1.1 General Configuration

Figure 1:
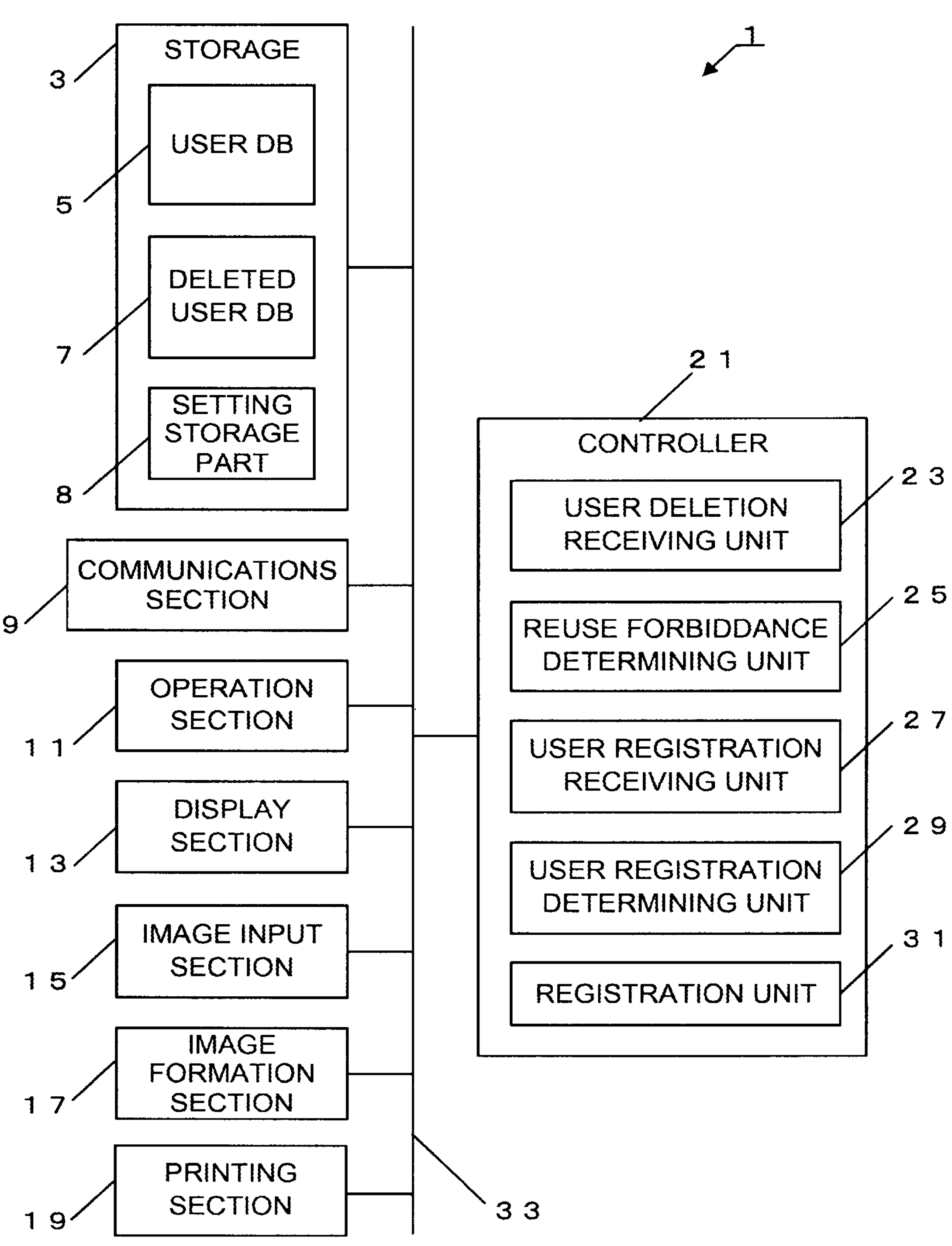
FIG. 1 is a diagram for describing functional components of a multifunction printer in a first embodiment.

FIG. 1 is a diagram for describing functional components of an image forming apparatus 1 of the present embodiment. The image forming apparatus 1 is also called a multifunction printer (MFP), and serves as a copier, a facsimile machine, a scanner, a printer, and an electronic mail terminal. The image forming apparatus 1 includes a storage 3, a communications section 9, an operation section 11, a display section 13, an image input section 15, an image formation section 17, a printing section 19, a controller 21, and a data bus 33.

The storage 3 is a functional part where various programs necessary for works of the image forming apparatus 1 and various kinds of data are stored. The storage 3 includes a recording device capable of transitory storage, such as a dynamic random access memory (DRAM). The storage 3 includes a non-transitory recording device, such as a solid state drive (SSD) constituted of a semiconductor memory and a hard disk drive (HDD) constituted of a magnetic disc. For convenience of description, the storage 3 is assumed as a single component, while regions for different uses, such as a region used for execution of programs (main storage region), a region for saving programs and data (auxiliary storage region), and a region used as a cache, may be constituted of different devices.

The storage 3 particularly includes a user database (DB) 5, a deleted user DB 7, and a setting storage part 8. The user DB 5 is a database for storing information concerning a user that has been subjected to user registration. The deleted user DB 7 is a database for storing information concerning a user that has been deleted after the user registration. The setting storage part 8 stores a work setting for the image forming apparatus 1. For instance, the setting storage part 8 stores a setting to or not to make a reuse forbidding function effective.

Figure 2A:
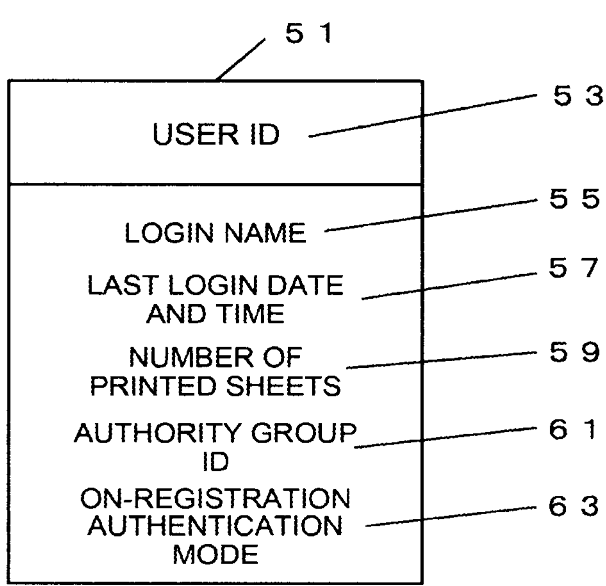
FIGS. 2A and 2B are diagrams for describing data structures of a user database and a deleted user database in the first embodiment.

FIG. 2A is a diagram for describing a data structure of the user DB 5. A table of the user DB 5 is constituted of a record 51, for instance. The record 51 includes such fields as a user identifier (ID) field 53, a login name field 55, a last login date and time field 57, a number of printed sheets field 59, an authority group ID field 61, and an on-registration authentication mode field 63. The fields of the record 51 store various values imparted to one user. The values imparted to one user are also referred to as attributes of the user.

The user ID field 53 is a field for storing a user ID imparted to one user, for instance. A value in the user ID field 53 is an example of personal identification information. The user ID may automatically be imparted by the image forming apparatus 1 or may be imparted by a manager. The user ID is information allowing unique identification of a user, so that it is undesirable that multiple users fall on the same user ID.

The login name field 55 is a field for storing a login name imparted to the user corresponding to one user ID, for instance. A value in the login name field 55 is an example of the personal identification information. The login name is used to authenticate the user in the image forming apparatus 1. The user ID and the login name may be identical to each other. Before using the image forming apparatus 1, the user inputs the login name through the operation section 11 so as to log into the image forming apparatus 1. The controller 21 identifies the user based on the login name as input during the login. The controller 21 associates a date and time of login and a history of the function of the image forming apparatus 1, which has been used by the user, with the login name, then stores the date and time of login and the history of the function in the user DB 5.

The last login date and time field 57 is a field for storing a date and time when the user corresponding to one user ID last logged into the image forming apparatus 1, for instance. A value in the last login date and time field 57 is an example of a history of user identification performed based on the personal identification information. The time to be stored as a last login date and time may be time when the user carried out login (time of login authentication) or time when the user carried out logout.

The number of printed sheets field 59 is a field for storing the number of sheets subjected by the user corresponding to one user ID to printing with the image forming apparatus 1. A value in the number of printed sheets field 59 is an example of a history of the function of the image forming apparatus 1, which has been used by the user corresponding to one user ID. The number of printed sheets may be a cumulative number of sheets subjected by the user to the printing with the image forming apparatus 1 or the number of sheets subjected by the user to printing at the time of the previous login. The number of printed sheets may also be an average number of printed sheets in a specified period. The number of printed sheets may include the number of sheets of recording paper subjected to printing using a copying function and the number of printed sheets subjected to recording using a printing function. The number of printed sheets may include the number of sheets output as an image, for instance. The number of printed sheets may include the number of sheets output to a file (portable document format (PDF) file, for instance) with a scanning function. The number of printed sheets may include the number of sheets transmitted with a facsimile (FAX) function.

The authority group ID field 61 is a field for storing an authority imparted to the user corresponding to one user ID, for instance. The authority is exemplified by a manager authority, a user authority, and a guest authority. Among the manager authority, the user authority, and the guest authority, the manager authority is the strongest and the guest authority is the weakest. A user having the manager authority is allowed to use all the functions of the image forming apparatus 1. A user having the guest authority is only allowed to use part of the functions of the image forming apparatus 1.

The on-registration authentication mode field 63 is a field for storing an authentication mode used during the registration of the user, for instance. A value in the on-registration authentication mode field 63 is an example of an authentication mode for authentication based on the login name. The authentication mode refers to a work mode for authenticating the user before the user uses a function of the image forming apparatus 1. The authentication mode is exemplified by a normal authentication mode and a simple authentication mode.

The normal authentication mode refers to an authentication mode where the image forming apparatus 1 requests the user to directly input a password during the login. If to be authenticated in the normal authentication mode, the user needs to use a keyboard, a numeric keypad or the like of the operation section 11 to directly input a string constituting the password. With respect to the input of a user name, a string constituting the user name may directly be input with the keyboard, the numeric keypad or the like of the operation section 11, as is the case with the password. For the input of the user name, the image forming apparatus 1 may display a list of user names on the display section 13 so as to allow the user to select a desired user name from the list with the operation section 11 and thus input the selected user name.

The simple authentication mode refers to an authentication mode where the image forming apparatus 1 does not request the user to directly input the password during the login. In the simple authentication mode, the image forming apparatus 1 identifies the user based on an input from the user and, at the same time, simplifies or omits checking of the authenticity of the user. The simple authentication mode is exemplified by a user number authentication mode and a quick authentication mode.

If the user number authentication mode is employed, a unique number (one of consecutive numbers given in user-registrational order, for instance) is set as a login name and no passwords are set during the user registration. In another case, a registration unit 31 may set a password only formed of figures (the same number as the login name, for instance). In the user number authentication mode, the user is able to input the login name and the password simply with the numeric keypad.

If the quick authentication mode is employed, the record 51 of the user DB 5 further has a field for storing image data of an icon, with the image data being associated with the login name of the user and as such stored. If the user performs an operation to select the icon, the controller 21 reads the corresponding login name from the user DB 5 and performs a process related to the login.

In the quick authentication mode, authentication may be carried out based on a password. In that case, the record 51 of the user DB 5 further has a field for storing a password. If a string is stored in the field for the password corresponding to the selected icon, the controller 21 compares the string as stored in the field with a string input through the operation section 11 so as to perform password authentication.

Even in the case where the password authentication is performed in the quick authentication mode, a direct input of the password may be omitted. In that case, if the user performs the operation to select the icon, the controller 21 reads the corresponding login name and password from the record 51 of the user DB 5 so as to perform authentication. The user is able to be authenticated without directly inputting the login name and the password.

In the quick authentication mode, the authentication based on a password may be omitted. In that case, if the user performs the operation to select the icon, the controller 21 allows the user to carry out the login, without performing the authentication based on a password. On this occasion either, the user does not need but to perform the operation to select the icon, that is to say, does not need to directly input strings constituting the login name and the password through the keyboard or the numeric keypad. In the case as above, the field for storing a password does not need to be provided in the record 51 of the user DB 5.

Figure 2B:
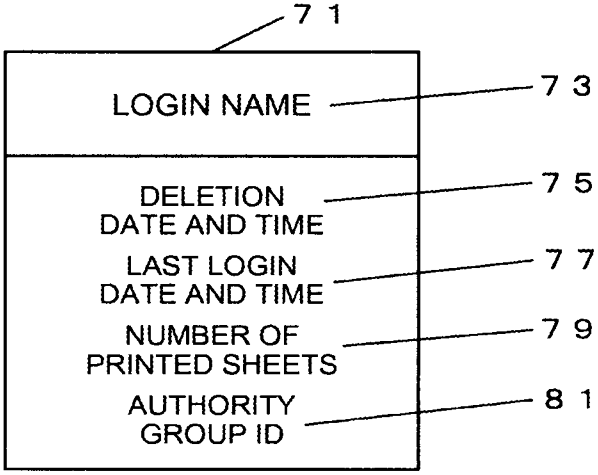

FIG. 2B is a diagram for describing a data structure of the deleted user DB 7. A table of the deleted user DB 7 is constituted of a record 71. The record 71 has such fields as a login name field 73, a deletion date and time field 75, a last login date and time field 77, a number of printed sheets field 79, and an authority group ID field 81.

The login name field 73 is a field for storing a login name having been used by one deleted user, for instance. The login name is used to authenticate a user in the image forming apparatus 1. The deletion date and time field 75 is a field for storing a date and time when one user was deleted from the user registration in the image forming apparatus 1, for instance. The last login date and time field 77 is a field for storing a date and time when one deleted user last carried out the login, for instance. In the last login date and time field 77, a date and time of last logout may be stored instead of the date and time of last login.

The number of printed sheets field 79 is a field for storing the number of sheets subjected by one deleted user to the printing with the image forming apparatus 1, for instance. The number of printed sheets may be a cumulative number of sheets subjected by the user to the printing with the image forming apparatus 1. The number of printed sheets may be the number of sheets subjected by the user to printing at the time of the previous login. The number of printed sheets may also be an average number of sheets subjected by the user to printing in a specified period. The number of printed sheets may include the number of sheets of recording paper subjected to the printing using the copying function and the number of printed sheets subjected to the recording using the printing function. The number of printed sheets may include the number of sheets output as an image, for instance. The number of printed sheets may include the number of sheets output to a file (PDF file, for instance) with the scanning function. The number of printed sheets may include the number of sheets transmitted with the FAX function.

The authority group ID field 81 is a field for storing an identifier indicating an authority having been imparted to one deleted user, for instance. The authority is exemplified by the manager authority, the user authority, and the guest authority. Among the manager authority, the user authority, and the guest authority, the manager authority is the strongest and the guest authority is the weakest. A user having the manager authority is allowed to use all the functions of the image forming apparatus 1. A user having the guest authority is only allowed to use part of the functions of the image forming apparatus 1.

The communications section 9 is a communications interface for wired communications and/or wireless communications. The communications section 9 may include a local area network (LAN) interface as a wired communications interface. The communications section 9 may include an interface for the connection to a telephone line network such as a public telephone line network. The communications section 9 may include a wireless LAN interface having a wireless communications function, such as a wireless fidelity (Wi-Fi) interface, as a wireless communications interface. The communications section 9 may include an interface connectable to a mobile communications network, such as a long term evolution (LTE) network and a fifth generation (5G) network.

The operation section 11 receives an operation input from the user. The operation section 11 is constituted of hardware keys and software keys, for instance. The operation section 11 includes a task key for performing a task, such as FAX transmission and image reading, and a stop key for stopping an operation. The operation section 11 may include a physical operation key, such as a task key, a stop key, a power source key, and a power saving key. The operation section 11 may be formed integrally with the display section 13 into a touch panel display.

The display section 13 is a functional part for displaying images and letters. The display section 13 is constituted of a liquid crystal display (LCD) or an organic electroluminescence (EL) panel, for instance. The display section 13 may be a single display device. The display section 13 may additionally include a display device externally connected. The display section 13 may include a speaker for outputting sound.

The image input section 15 reads an image (original) and outputs the image as image data. The image input section 15 is constituted of a common scanner (image input device). The image input section 15 may input image data from an external storage medium such as a universal serial bus (USB) memory. The image input section 15 may receive an image over a network.

The image formation section 17 generates output image data based on the image data as input. If the image forming apparatus 1 is to work as a facsimile machine on the transmission side, the output image data generated by the image formation section 17 is transmitted to a destination through the communications section 9. If the image forming apparatus 1 is to work as a facsimile machine on the reception side, a copier or a printer, the output image data generated by the image formation section 17 is printed by the printing section 19 on a printing medium such as paper.

The printing section 19 is a printing mechanism such as an inkjet printer and a laser printer. The printing section 19 prints the output image data generated by the image formation section 17 on the printing medium such as paper.

The controller 21 reads and executes various programs stored in the storage 3 so as to realize various functions. The controller 21 is constituted of one or multiple control units or control circuits. For instance, the controller 21 is constituted of a central processing unit (CPU) or a system-on-a-chip (SoC) device.

The controller 21 operates as a user deletion receiving unit 23, a reuse forbiddance determining unit 25, a user registration receiving unit 27, a user registration determining unit 29, and the registration unit 31. The user deletion receiving unit 23 performs a process for receiving, through the operation section 11, an operation to delete a registered user (request for deletion of a registered user).

If the request for deletion of a registered user has been received, the reuse forbiddance determining unit 25 performs a process for determining whether to forbid reuse of a login name associated with the user as an objective of the received request for deletion. Using a login name means that the manager or the like assigns one string to a user as a login name of the user during the user registration in the image forming apparatus 1. Reusing a login name means that the manager or the like assigns one string to one user as a login name of the user during the user registration in the image forming apparatus 1, then, after cancelling the registration of the user, assigns the same string again to the user or another user as a login name. As an example, reusing a login name "USER01" means that the manager assigns a string "USER01" to a user U1 as a login name during the user registration in the image forming apparatus 1 so as to carry out the user registration, then, after cancelling the user registration of the user U1, assigns the string "USER01" again to the user U1 or a user U2.

The user registration receiving unit 27 performs a process for receiving a request for registration of a new user through the operation section 11. The user registration determining unit 29 performs a process for determining whether to approve the request for registration of a new user.

The user registration determining unit 29 performs a process for determining whether to permit user registration using a login name designated, based on the result of determination by the reuse forbiddance determining unit 25. If it is determined that the designated login name is the login name, whose reuse is forbidden by the reuse forbiddance determining unit 25, the user registration determining unit 29 determines to refuse a request for the user registration. The user registration determining unit 29, which has determined to refuse the request for the user registration, uses the display section 13 to display an error message. If it is determined that the designated login name is not the login name, whose reuse is forbidden by the reuse forbiddance determining unit 25, the user registration determining unit 29 determines to permit the user registration. The user registration determining unit 29, which has determined to permit the user registration, instructs the registration unit 31 to use the designated login name to register the user.

The registration unit 31 performs a process for associating a login name for identifying a user with the user and registering the login name, depending on the result of determination by the user registration determining unit 29. To be more specific: If the user registration determining unit 29 permits the registration, the registration unit 31 performs a process for associating the user and the login name with each other and storing the login name associated with the user in the user DB 5. If the user registration determining unit 29 refuses the registration, the registration unit 31 does not perform a process for storing information concerning the user in the user DB 5. The data bus 33 connects between the functional components of the image forming apparatus 1 so as to transmit data.

1.2 User Deletion Process

Figure 3:
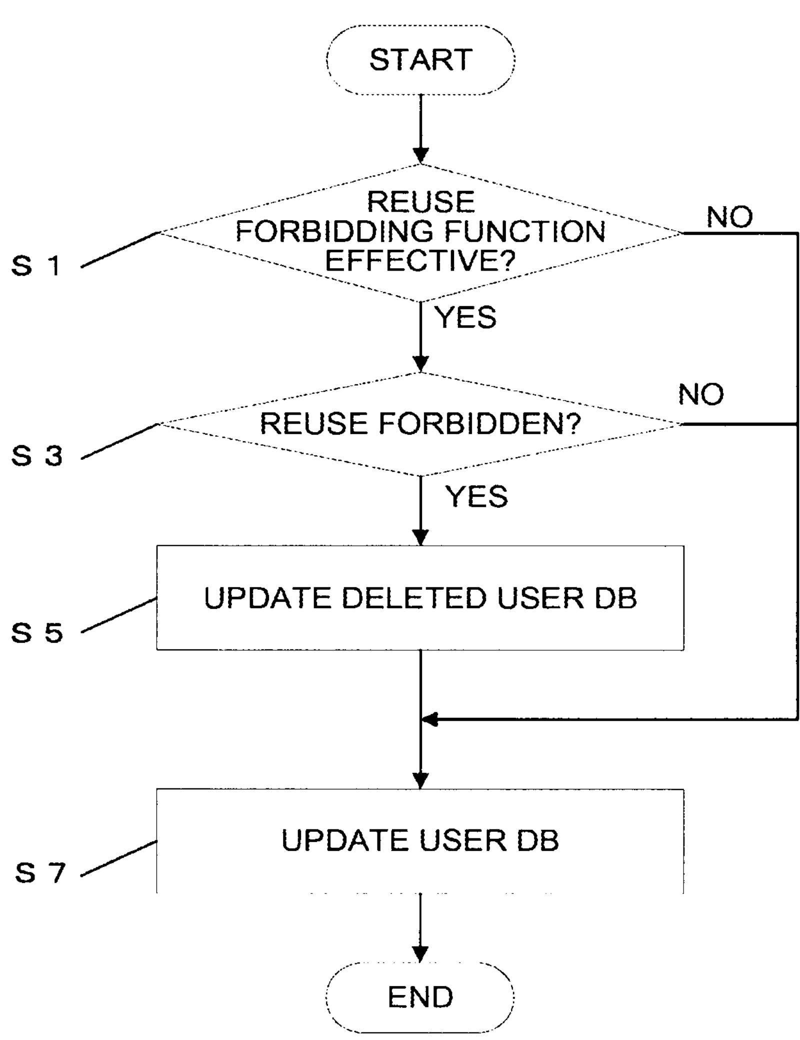
FIG. 3 is a diagram for describing a user deletion process in the first embodiment.

FIG. 3 is a diagram for describing a user deletion process in the present embodiment. It is assumed that, prior to the user deletion process, a manager of the image forming apparatus 1 inputs, through the operation section 11, the setting to or not to make the reuse forbidding function effective. The setting as input is stored in the setting storage part 8.

If receiving, through the operation section 11, the operation to delete a registered user, the user deletion receiving unit 23 refers to the setting storage part 8 so as to determine whether the reuse forbidding function is effective (step S1). If the reuse forbidding function is effective (YES in step S1), the reuse forbiddance determining unit 25 determines (performs reuse forbiddance determination) whether to forbid reuse of the login name of the user in question (step S3).

The reuse forbiddance determining unit 25 permits the reuse of the login name of the user in question if any of the following determination criteria (A1) through (A4) is fulfilled. If none of the determination criteria (A1) through (A4) is fulfilled, the reuse forbiddance determining unit 25 forbids the reuse of the login name of the user in question.

(A1) The case where, in the user DB 5, a value stored in the number of printed sheets field 59 for the user in question is zero.

(A2) The case where, in the user DB 5, any effective value is not stored in the last login date and time field 57 for the user in question. In other words, the case where the user in question has never carried out login. The case where any effective value is not stored is exemplified by the case where a null value is stored, the case where a date and time after the current date and time are stored, and the case where a date and time before the day when the image forming apparatus 1 was put into service are stored.

(A3) The case where, in the user DB 5, a value stored in the on-registration authentication mode field 63 for the user in question represents the simple authentication mode.

(A4) The case where the user deletion receiving unit 23 has received, through the operation section 11, an operation to perform a block deletion of all users already registered in the user DB 5.

If it is determined in step S3 that the reuse is to be forbidden, the reuse forbiddance determining unit 25 updates the deleted user DB 7 (step S5). The reuse forbiddance determining unit 25 reads values in the login name field 55, the last login date and time field 57, the number of printed sheets field 59, and the authority group ID field 61 of the user DB 5, and copies the values into the login name field 73, the last login date and time field 77, the number of printed sheets field 79, and the authority group ID field 81 of the deleted user DB 7, respectively. The reuse forbiddance determining unit 25 stores a date and time when this process has been performed in the deletion date and time field 75.

Then, the reuse forbiddance determining unit 25 deletes the record 51 for the user as designated in step S1 from the user DB 5 (step S7). If the answer in step S1 is NO, the processing by the controller 21 proceeds to step S7 without going through steps S3 and S5. If it is determined in step S3 that the reuse is not to be forbidden, the processing by the controller 21 proceeds to step S7 without going through step S5.

1.3 User Registration Process

Figure 4:
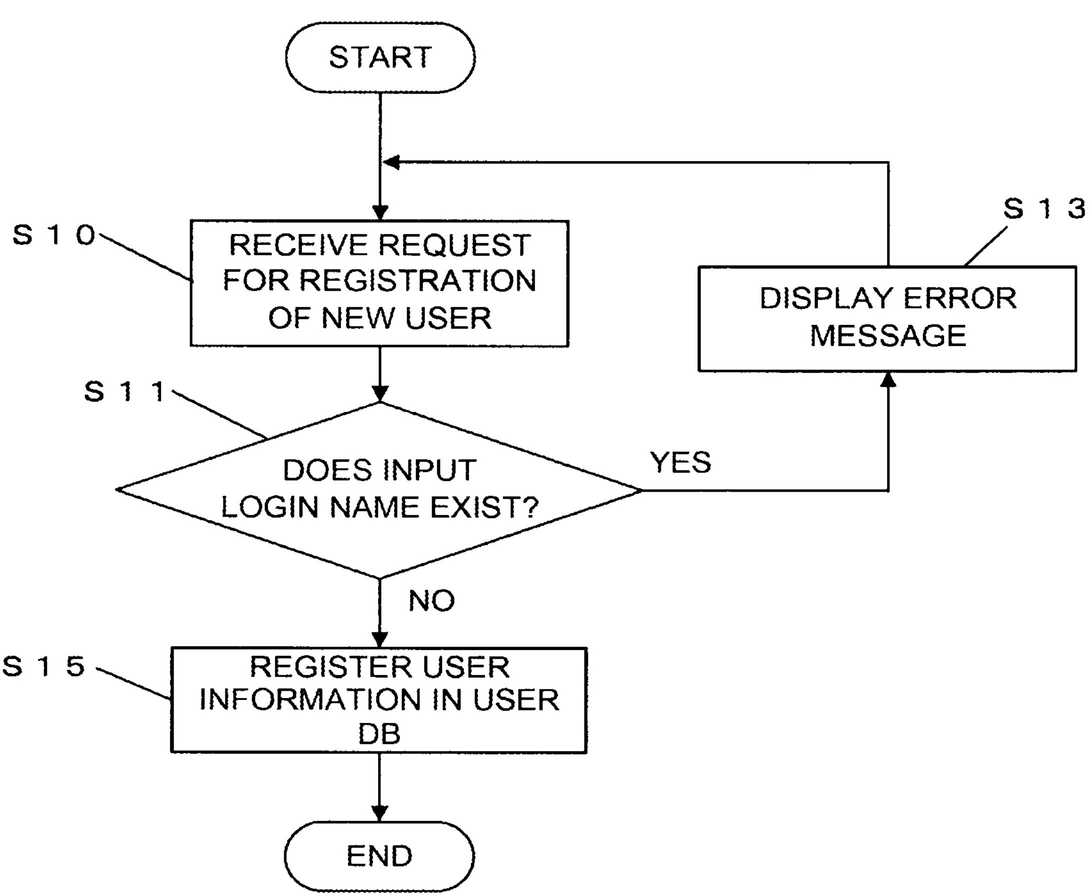
FIG. 4 is a diagram for describing a user registration process in the first embodiment.

FIG. 4 is a diagram for describing a user registration process in the present embodiment. First of all, the user registration receiving unit 27 receives, through the operation section 11, a request for registration of a new user (step S10). For instance, a user hoping for new registration or the manager of the image forming apparatus 1 inputs, through the operation section 11, a login name whose use is desired. The operation section 11 transfers the input login name to the user registration receiving unit 27.

Next, the user registration determining unit 29 accesses the deleted user DB 7 so as to determine whether the record 71, which has the input login name stored in the login name field 73, exists (step S11).

Figure 5:
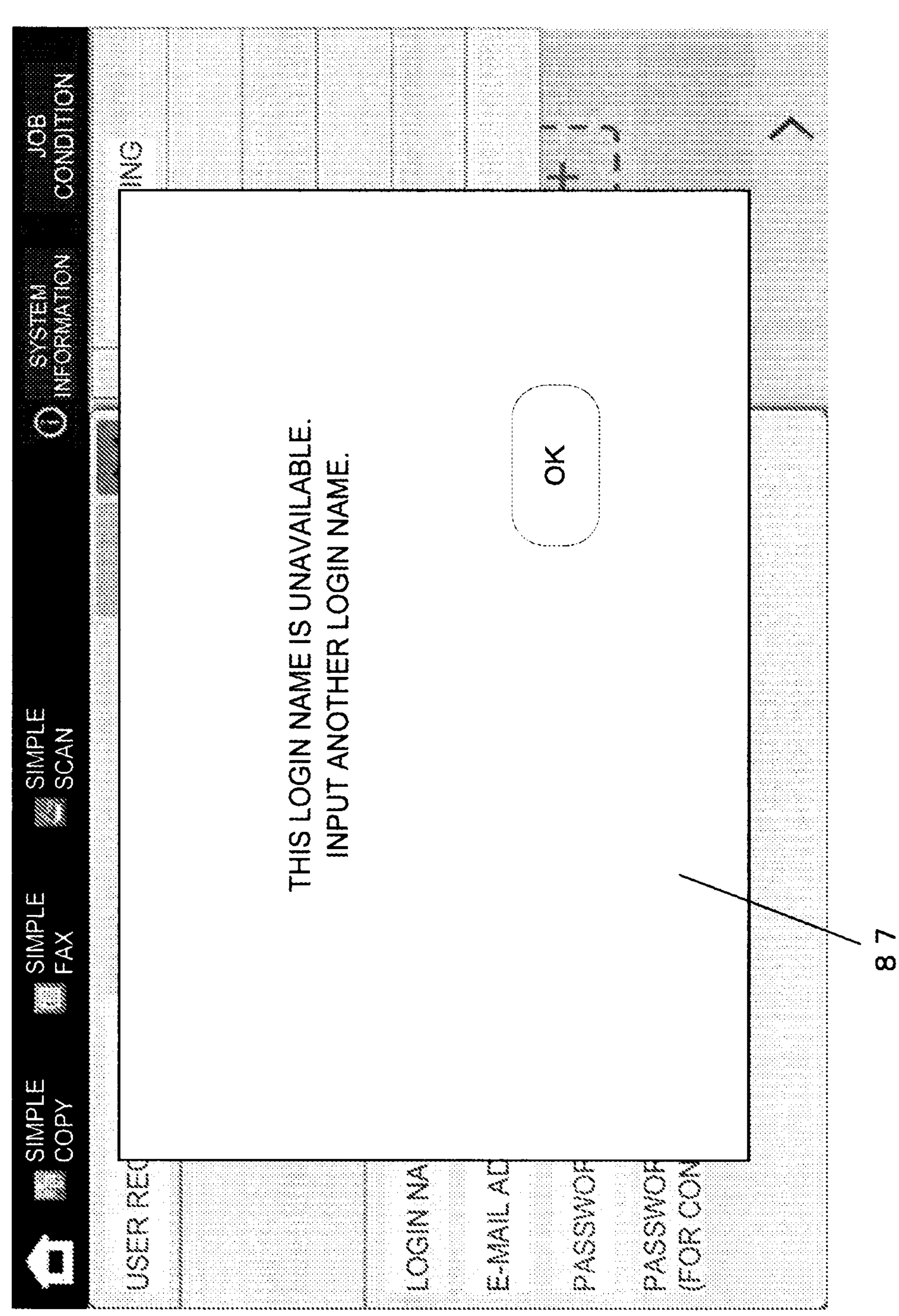
FIG. 5 is a diagram for describing an example of an error message displayed in the first embodiment.

If the record 71, which has the input login name stored in the login name field 73, exists in the deleted user DB 7 (YES in step S11), the user registration determining unit 29 uses the display section 13 to display an error message (step S13). FIG. 5 illustrates an example of the error message, which is displayed in step S13 in the present embodiment. In FIG. 5, the displayed error message notifies that the login name is unavailable, and recommends input of another login name, while the input login name may additionally be contained in the error message. After the display of the error message, the processing by the controller 21 returns to step S10.

If the record 71, which has the input login name stored in the login name field 73, does not exist in the deleted user DB 7 (NO in step S11), the registration unit 31 adds the record 51 to the user DB 5 (step S15). The record 51 to be added includes the login name field in which the input login name is stored.

1.4 Effects

According to the present embodiment, user registration using the login name of the deleted user is permitted if the login name of the deleted user fulfills any of the above determination criteria (A1) through (A4). If the login name of the deleted user fulfills none of the determination criteria (A1) through (A4), the user registration using the login name of the deleted user is forbidden.

1.5 Modification

The reuse forbiddance determining unit 25 employs the determination criteria (A1) through (A4), while not the whole but part of the determination criteria (A1) through (A4) may be employed. For instance, the reuse forbiddance determining unit 25 may employ the determination criteria (A1) through (A3) and not employ the determination criterion (A4).

The determination criterion (A1) refers to the case where the number of printed sheets as stored for the user in question is zero, while the threshold may not be zero. The case where the number of printed sheets is not more than 100 may be employed as a determination criterion. With respect to the determination criterion (A1), determination is made according to a use history of a printing function, while either the number of sheets subjected to monochrome printing or the number of sheets subjected to color printing may only be employed as a determination criterion.

Furthermore, the reuse forbiddance determining unit 25 may make determination according to a use history of another function of the image forming apparatus 1, with the use history being to be employed instead of or along with the number of printed sheets. As mentioned before, the image forming apparatus 1 serves as a copier, a facsimile machine, a scanner, a printer, and an electronic mail terminal. Consequently, the reuse forbiddance determining unit 25 may employ the number of copied sheets, the number of cases/sheets of facsimile transmission, the number of cases/sheets of facsimile transmission to a specified destination, the number of cases of electronic mail transmission, the number of cases of electronic mail transmission to a specified destination, the number of scanned sheets or the like as a determination criterion.

With respect to the determination criterion (A2), the presence or absence of a value stored in the last login date and time field 57 for the user in question is employed as a criterion, while whether the date and time as stored in the last login date and time field 57 are before specified date and time may be employed as a determination criterion. For instance, the reuse may be permitted if the date and time as stored in the last login date and time field 57 are before Mar. 30, 2019, and forbidden if the date and time as stored in the last login date and time field 57 are after Apr. 1, 2019. The reuse forbiddance determining unit 25 may employ, as a determination criterion, whether the date and time as stored in the last login date and time field 57 are a specified time or longer before the date and time when the determination has been made. For instance, the reuse may be permitted if the date and time as stored in the last login date and time field 57 are one year or longer before the date and time when the determination has been made, and forbidden if one year has not elapsed since the stored date and time.

In step S13, the user registration determining unit 29 may output a sound indicating an error from a speaker of the display section 13 with or without displaying the error message.

2. Second Embodiment 2.1 General Configuration

Figure 6:
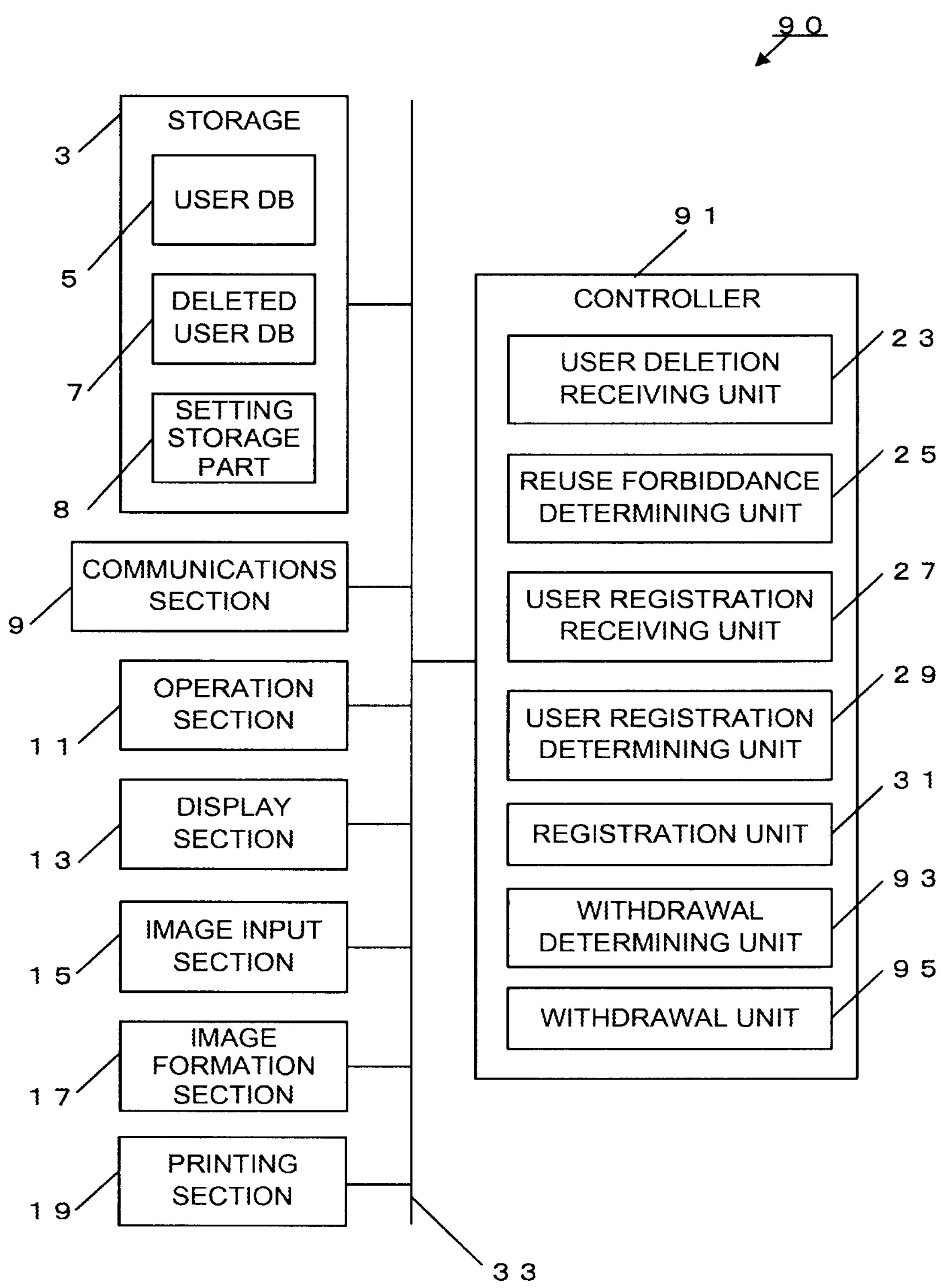
FIG. 6 is a diagram for describing functional components of a multifunction printer in a second embodiment.

FIG. 6 is a diagram for describing functional components of an image forming apparatus 90 of the present embodiment. A functional component shared by the image forming apparatuses 1 and 90 is given the same reference sign. The description below is made on the differences between the image forming apparatuses 1 and 90.

The image forming apparatus 90 is different from the image forming apparatus 1 in functional components of a controller 91. The controller 91 includes a withdrawal determining unit 93 and a withdrawal unit 95 in addition to the functional components of the controller 21 in the image forming apparatus 1.

The withdrawal determining unit 93 determines whether a setting of reuse forbiddance is allowed to be removed with respect to a login name whose reuse is forbidden. The withdrawal unit 95 removes the setting of reuse forbiddance made for the login name.

A setting storage part 8 in the present embodiment is different from the setting storage part 8 in the first embodiment in that the setting storage part 8 in the present embodiment stores a setting to or not to forbid withdrawal of reuse forbiddance on a login name as a work setting for the image forming apparatus 90. Such setting is made in accordance with the input through the operation section 11.

Figure 7:
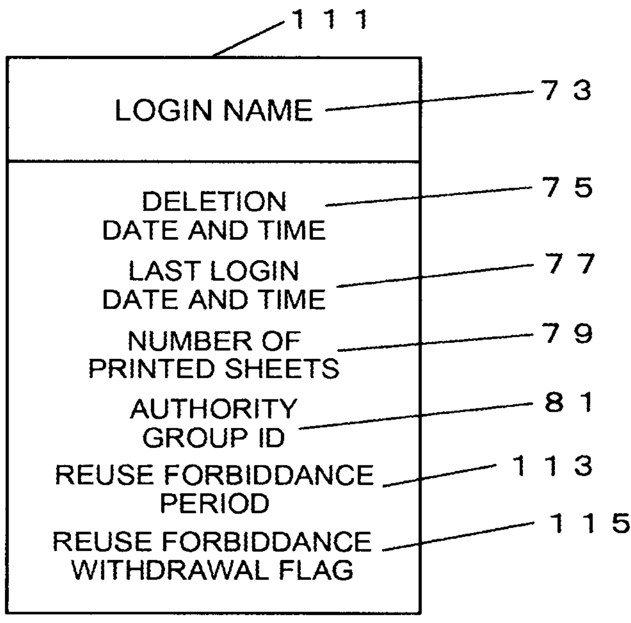
FIG. 7 is a diagram for describing a data structure of a deleted user database in the second embodiment.

FIG. 7 is a diagram for describing a structure of a record stored in a deleted user DB 7 in the present embodiment. The deleted user DB 7 in the present embodiment includes a record 111 instead of the record 71. The record 111 has a reuse forbiddance period field 113 and a reuse forbiddance withdrawal flag field 115 in addition to the same fields as the record 71. The reuse forbiddance period field 113 is a field for storing a period (reuse forbiddance period) that reuse of a login name is forbidden for. The reuse forbiddance period is zero or a specified period (three months or one year, for instance). The reuse forbiddance period being zero means that the reuse forbiddance period is not set. If use of the login name is to be lastingly forbidden, the reuse forbiddance period may be indefinite. The reuse forbiddance period may not be stored in the reuse forbiddance period field 113 of the record 71 for each user, and the reuse forbiddance period, which is stored in the setting storage part 8, may be used instead. The reuse forbiddance withdrawal flag field 115 is a field for storing a flag indicating that the reuse forbiddance on the login name has been withdrawn.

2.2 User Deletion Process

Referring to FIG. 3, a user deletion process in the present embodiment is described. In the present embodiment, the reuse forbiddance determining unit 25 receives input of the reuse forbiddance period through the operation section 11 during the update of the deleted user DB 7 in step S5.

2.3 Reuse Forbiddance Withdrawal Process

Figure 8:
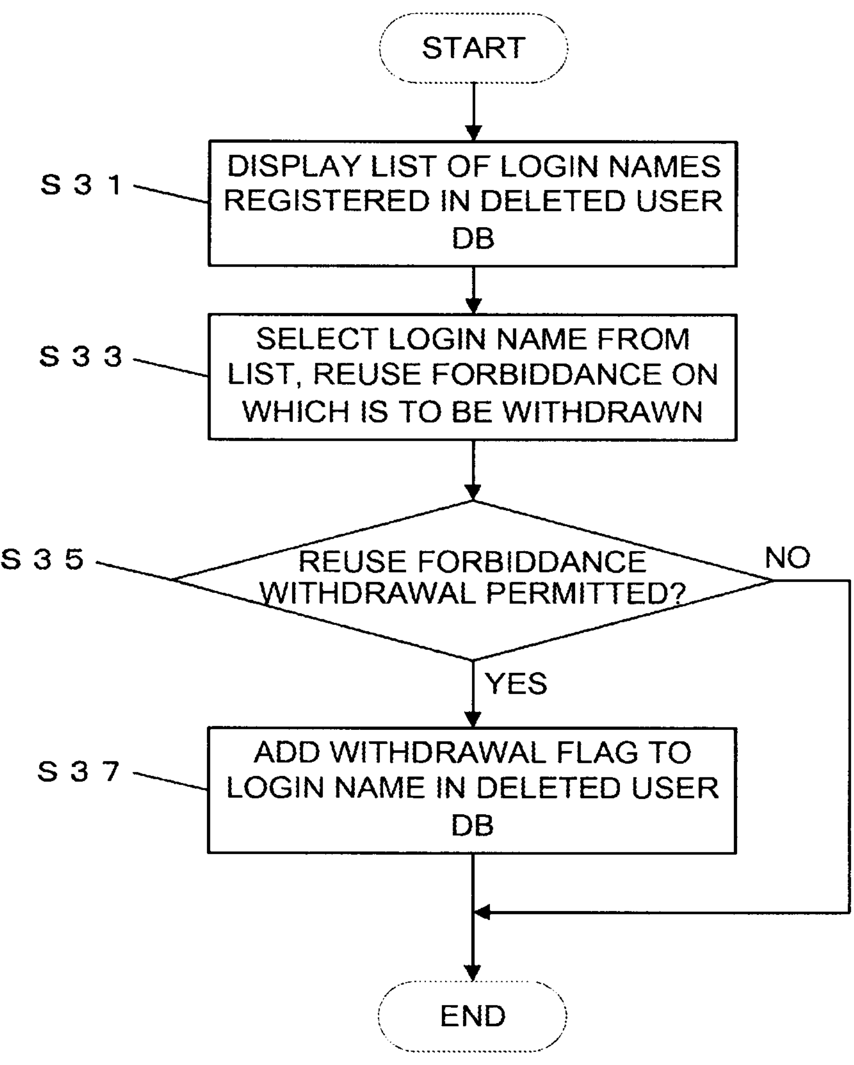
FIG. 8 is a diagram for describing a reuse forbiddance withdrawal process in the second embodiment.

FIG. 8 is a diagram for describing a reuse forbiddance withdrawal process in the present embodiment. If receiving an operation to start the reuse forbiddance withdrawal process through the operation section 11, the withdrawal determining unit 93 uses the display section 13 to display a list of login names registered in the deleted user DB 7 (step S31). The withdrawal determining unit 93 receives, through the operation section 11, an operation to select a login name, reuse forbiddance on which is to be withdrawn (step S33). With respect to the selected login name, the withdrawal determining unit 93 determines (performs reuse forbiddance withdrawal determination) whether to withdraw the reuse forbiddance (step S35). As to the list of login names displayed in step S31, the login name, reuse forbiddance on which the withdrawal determining unit 93 does not permit to be withdrawn, may not be displayed or may be made unable to be selected.

In step S35, the withdrawal determining unit 93 refers to the deleted user DB 7, and does not permit, or forbids, withdrawal of the reuse forbiddance on the selected login name if any of the following determination criteria (B1) through (B5) is fulfilled.

(B1) The case where a value not smaller than 1 is stored in the number of printed sheets field 79 corresponding to the selected login name in the login name field 73. Or the case where a date and time are stored in the last login date and time field 77 corresponding to the selected login name in the login name field 73 (in other words, the case where login has been carried out with the selected login name in the login name field 73 even once).

(B2) The case where the manager authority is stored in the authority group ID field 81 corresponding to the selected login name in the login name field 73.

(B3) The case where, at the present point in time (point in time when the reuse forbiddance withdrawal process has been performed), the reuse forbiddance period in the reuse forbiddance period field 113 corresponding to the selected login name in the login name field 73 does not elapse yet from the date and time in the deletion date and time field 75 corresponding to the selected login name in the login name field 73.

(B4) The case where, in the deleted user DB 7, an indefinite period is stored in the reuse forbiddance period field 113 corresponding to the selected login name in the login name field 73.

(B5) The case where a setting to forbid the withdrawal of the reuse forbiddance on the login name is stored in the setting storage part 8.

If none of the determination criteria (B1) through (B5) is fulfilled, the withdrawal determining unit 93 permits the withdrawal of the reuse forbiddance on the selected login name.

If the withdrawal determining unit 93 permits the withdrawal of the reuse forbiddance on the login name (YES in step S35), the withdrawal determining unit 93 updates the deleted user DB 7. In other words, the withdrawal determining unit 93 stores a flag indicating that the reuse forbiddance has been withdrawn in the reuse forbiddance withdrawal flag field 115 of the record 111 corresponding to the selected login name in the login name field 73 in the deleted user DB 7 (step S37). If the withdrawal determining unit 93 forbids the withdrawal of the reuse forbiddance on the login name (NO in step S35), the withdrawal determining unit 93 terminates the process without any other operations.

2.4 User Registration Process

Figure 9:
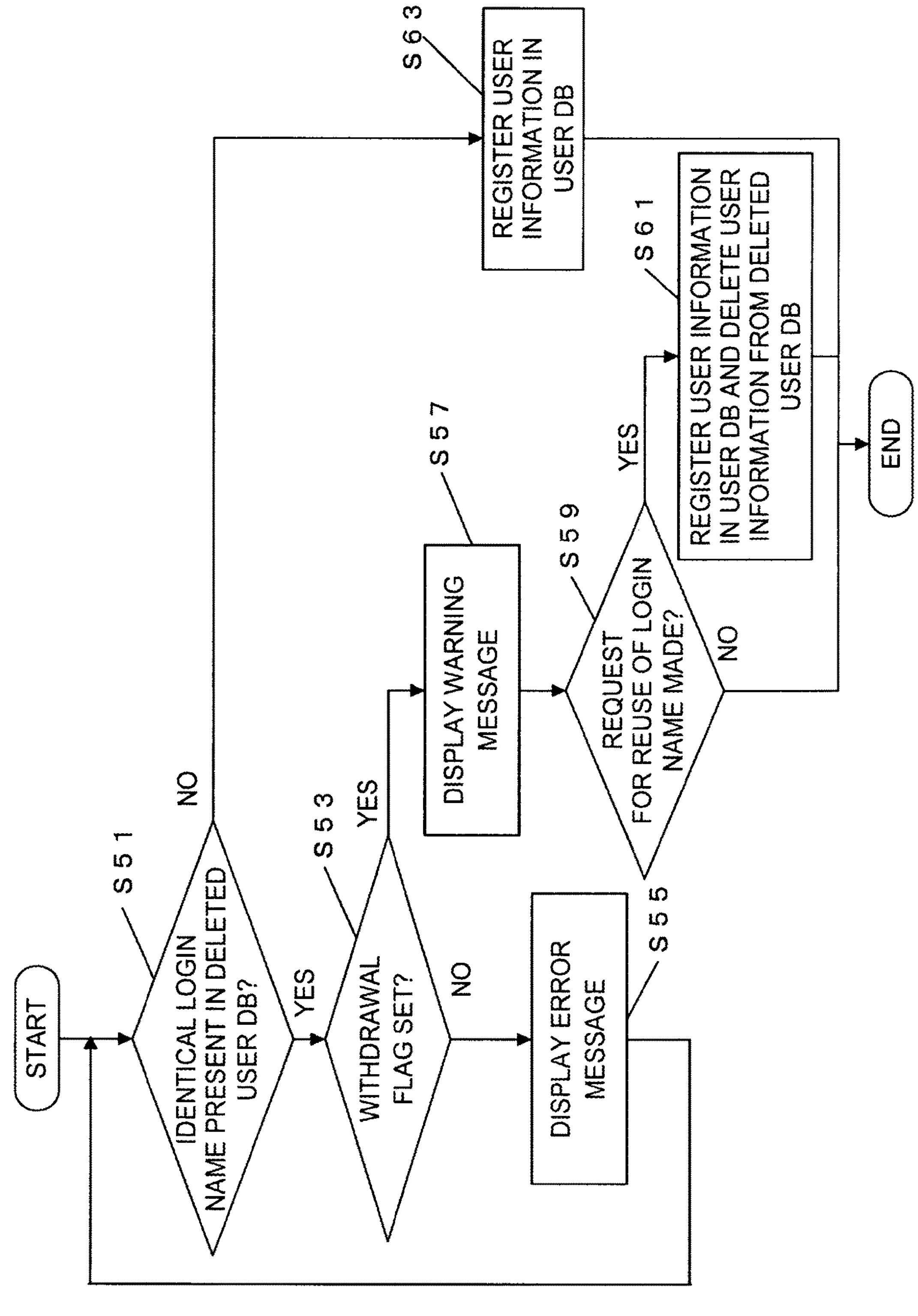
FIG. 9 is a diagram for describing a user registration process in the second embodiment.

FIG. 9 is a diagram for describing a user registration process in the present embodiment. If the user registration receiving unit 27 receives, through the operation section 11, an input to request user registration, the user registration determining unit 29 determines whether a login name designated by a request for user registration is already registered in the deleted user DB 7 (step S51).

If the designated login name is already registered in the deleted user DB 7 (YES in step S51), the user registration determining unit 29 determines whether a withdrawal flag is stored in the reuse forbiddance withdrawal flag field 115 of the record 111 corresponding to the designated login name in the login name field 73 (step S53).

If the withdrawal flag is not stored in the reuse forbiddance withdrawal flag field 115 (NO in step S53), the user registration determining unit 29 uses the display section 13 to display an error message 87 (step S55).

If the withdrawal flag is stored in the reuse forbiddance withdrawal flag field 115 (YES in step S53), the user registration determining unit 29 uses the display section 13 to display a warning message 119 (step S57). On the basis of the contents of warning, the warning message 119 inquires whether to reuse the login name (a button 119*a*) or not (a button 119*b*) (step S59).

Figure 10:
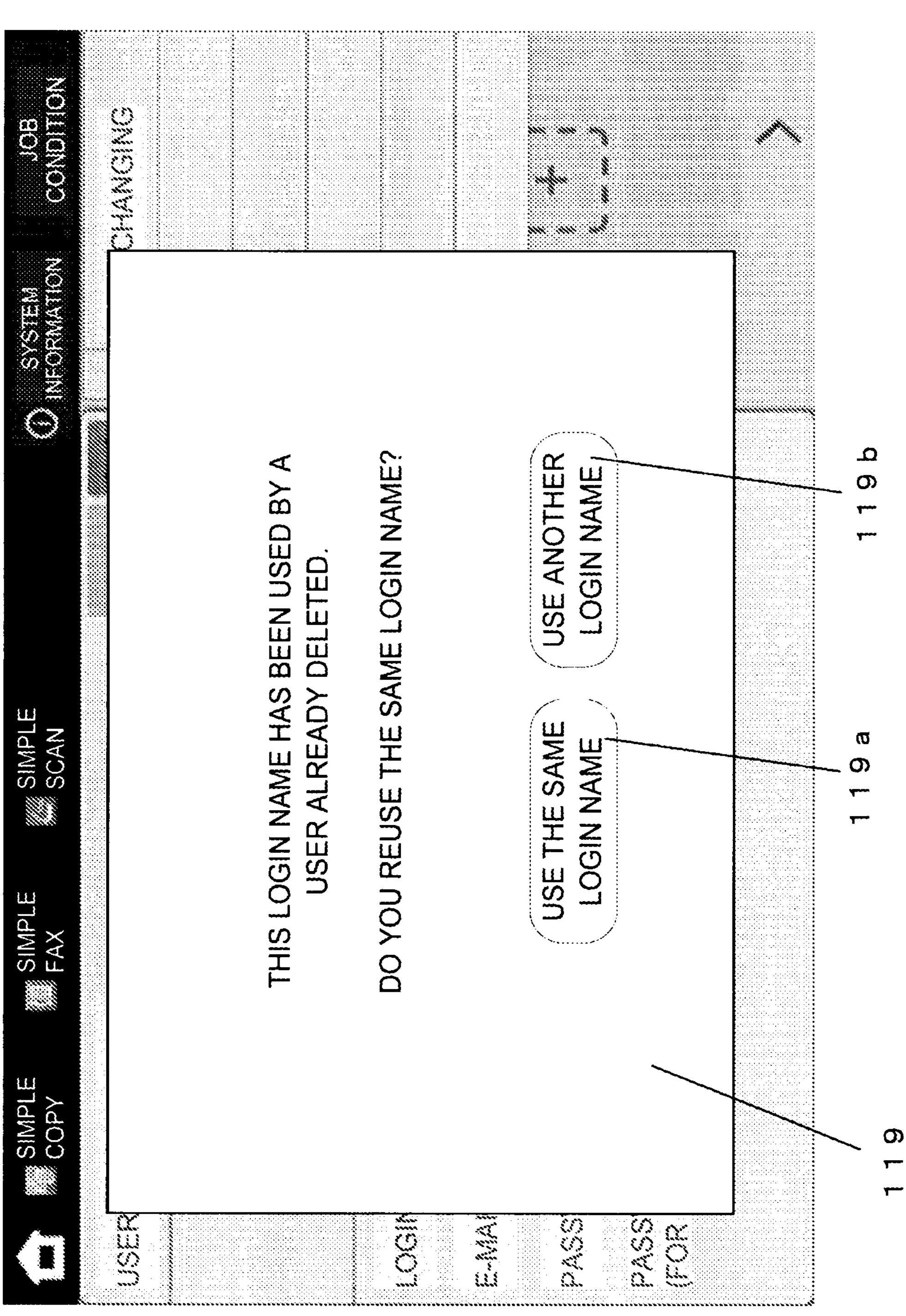
FIG. 10 is a diagram for describing an example of a warning message displayed in the second embodiment.

FIG. 10 is a diagram for describing an example of the warning message displayed in step S57. The warning message 119 warns that the login name, which is coming into use for the user registration, has been used in the past.

The user registration determining unit 29 may read part or the whole of values in the fields corresponding to the login name from the record 111 of the deleted user DB 7 so as to display the read values along with the warning message 119. For instance, the user registration determining unit 29 may read the values in the deletion date and time field 75 and the reuse forbiddance period field 113 both corresponding to the login name so as to display "Deletion date and time: January 1, 2020, Reuse forbiddance period: one year" additionally to the warning message 119. In another case, the user registration determining unit 29 may read the value in the number of printed sheets field 79 corresponding to the login name so as to display "Number of printed sheets: zero" additionally to the warning message 119. In yet another case, the user registration determining unit 29 may read the value in the authority group ID field 81 corresponding to the login name so as to display an authority group that an authority group ID indicated by the read value belongs to, that is to say, display “Authority group: guest authority” additionally to the warning message 119. Such additional information may be displayed in step S55 along with the error message 87.

If receiving an input to reuse the login name (input selecting the button 119*a*) through the operation section 11 (YES in step S59), the user registration determining unit 29 adds a new record 51 to the user DB 5 and deletes the record 111 from the deleted user DB 7 in accordance with the user registration using the login name (step S61).

If receiving an input not to reuse the login name (input selecting the button 119*b*) through the operation section 11 (NO in step S59), the user registration determining unit 29 terminates the process without carrying out the user registration using the login name.

If it is determined in step S51 that the login name as designated by the request for user registration is not registered in the deleted user DB 7 (NO in step S51), the user registration determining unit 29 updates the user DB 5. In other words, the user registration determining unit 29 adds a new record 51 to the user DB 5 in accordance with the user registration using the login name (step S63) and then terminates the process.

2.5 Effects

According to the present embodiment, it is possible to permit reuse of a login name whose reuse has been forbidden. Such permission is given according to an attribute of the user (former user), who has previously used the login name coming into reuse, such as the use history (the number of printed sheets), the login history (the last login date and time), the presence or absence of the manager authority (the authority group ID), and the amount of time elapsed from the deletion of the login name (the deletion date and time). The permission can be given according to the settings for the image forming apparatus 90, which are stored in the setting storage part 8.

2.6 Modification

In step S37 of the reuse forbiddance withdrawal process, the withdrawal determining unit 93 stores the flag in the reuse forbiddance withdrawal flag field 115 of the deleted user DB 7 during the permission of the withdrawal of the reuse forbiddance on the login name. Instead of storing the flag, the withdrawal determining unit 93 may delete the record 111, which includes the login name, from the deleted user DB 7. In that case, the reuse forbiddance withdrawal flag field 115 can be omitted from the record 111 in the deleted user DB 7.

The withdrawal determining unit 93 may perform the reuse forbiddance withdrawal determination in step S35 on all the login names as registered in the deleted user DB 7, immediately before the user registration determining unit 29 begins the determination in step S51 in response to the reception of a request to perform the user registration process by the user registration receiving unit 27. Depending on the result of such operation, the withdrawal determining unit 93 stores the flag in the reuse forbiddance withdrawal flag field 115. Such measures make it possible to permit reuse of the login name, whose reuse forbiddance period has elapsed, even if the reuse forbiddance withdrawal process is not expressly performed.

In the reuse forbiddance period field 113, a date and time when a period of reuse forbiddance will elapse may be stored instead of the length of the period of reuse forbiddance. In that case, the determination criterion (B3) is replaced by a determination criterion (B3a) below.

(B3a) The case where the present point in time (point in time when the reuse forbiddance withdrawal process has been performed) is earlier than the end of the reuse forbiddance period in the reuse forbiddance period field 113 corresponding to the login name in the login name field 73.

3. Third Embodiment

In the present embodiment, the image forming apparatus 90 is taken as an example, as is the case with the second embodiment. The chief difference between the second and third embodiments is the timing of the reuse forbiddance withdrawal determination. In the present embodiment, the reuse forbiddance withdrawal determination is performed next to the user deletion process.

3.1 User Deletion Process

Figure 11:
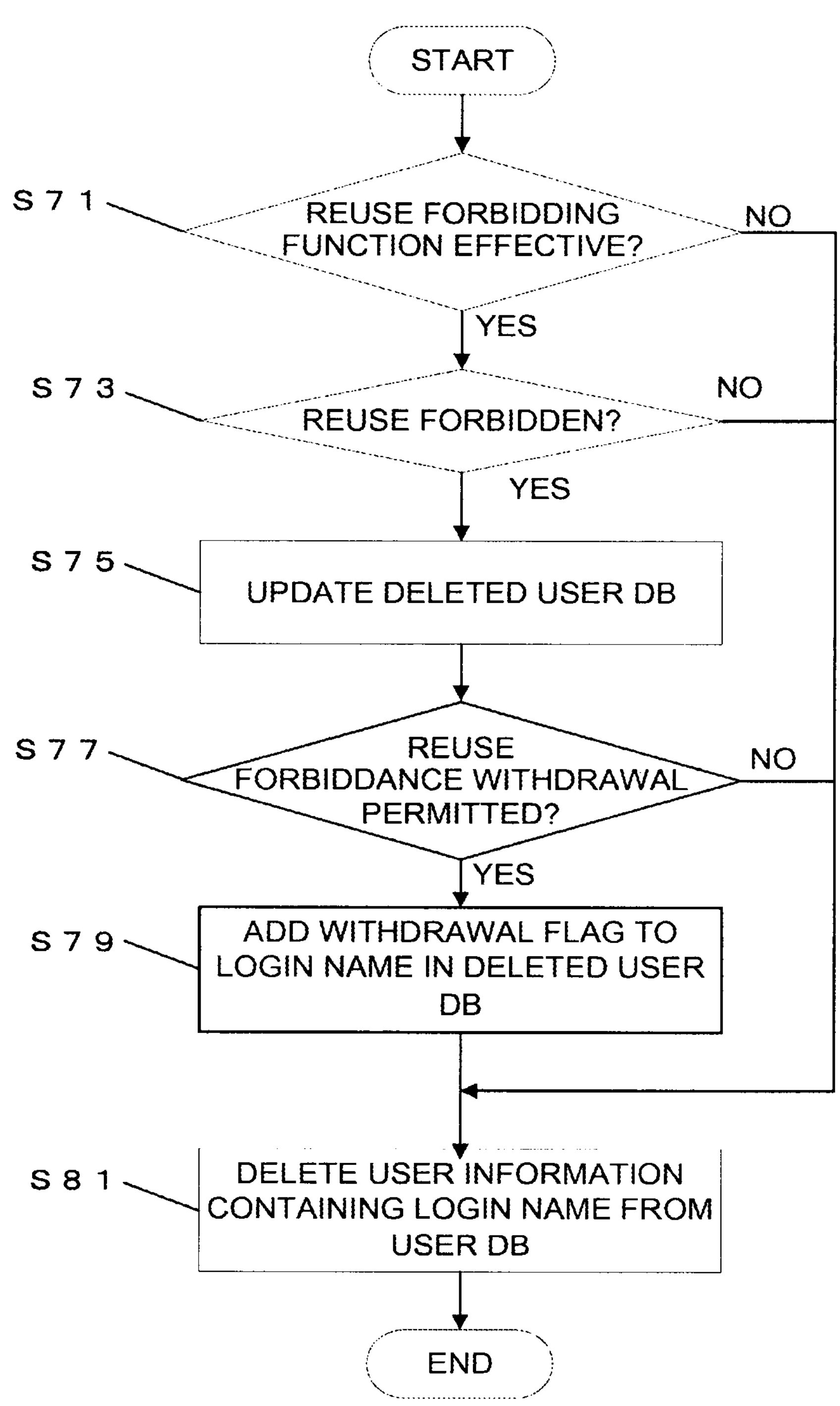
FIG. 11 is a diagram for describing a user deletion process in a third embodiment.

FIG. 11 is a diagram for describing a user deletion process in the present embodiment. If receiving, through the operation section 11, the operation to delete a registered user, the user deletion receiving unit 23 refers to the setting storage part 8 so as to determine whether the reuse forbidding function is effective (step S71). If the reuse forbidding function is effective (YES in step S71), the reuse forbiddance determining unit 25 determines whether to forbid reuse of the login name of the user in question (step S73). The reuse forbiddance determination in step S73 is performed based on the determination criteria (A1) through (A4) similarly to the determination in step S3.

If it is determined in step S73 that the reuse is to be forbidden, the reuse forbiddance determining unit 25 updates the deleted user DB 7 (step S75). The reuse forbiddance determining unit 25 reads values in the login name field 55, the last login date and time field 57, the number of printed sheets field 59, and the authority group ID field 61 of the user DB 5. Then, the reuse forbiddance determining unit 25 copies the read values into the login name field 73, the last login date and time field 77, the number of printed sheets field 79, and the authority group ID field 81 of the record 111, respectively. In the deletion date and time field 75, a date and time when this process has been performed are stored.

At this time, the reuse forbiddance determining unit 25 may use the display section 13 to display a message asking about the reuse forbiddance period of the login name of the user whose deletion is requested. If the reuse forbiddance period is input through the operation section 11 in response to the above message, the input reuse forbiddance period may be stored in the reuse forbiddance period field 113.

Next, the withdrawal determining unit 93 performs the reuse forbiddance withdrawal determination with respect to the login name of the user whose deletion is requested (step S77). The reuse forbiddance withdrawal determination in step S77 is performed based on the determination criteria (B1) through (B5) similarly to the determination in step S35.

Figure 12:
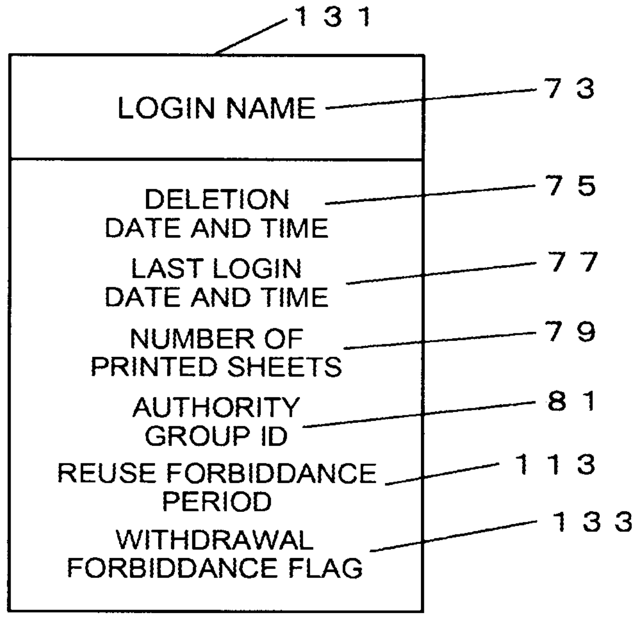
FIG. 12 is a diagram for describing a data structure of a deleted user database in the third embodiment.

FIG. 12 is a diagram illustrating a structure of a record 131 included in a deleted user DB 7 in the present embodiment. In comparison with the record 111, the record 131 has a withdrawal forbiddance flag field 133 instead of the reuse forbiddance withdrawal flag field 115. The withdrawal forbiddance flag field 133 is a field for storing a flag indicating that the withdrawal of the reuse forbiddance on the login name is forbidden.

If the withdrawal determining unit 93 forbids the withdrawal of the reuse forbiddance on the login name (NO in step S77), the withdrawal determining unit 93 updates the deleted user DB 7. In other words, the withdrawal determining unit 93 stores the flag indicating that the withdrawal of the reuse forbiddance is forbidden in the withdrawal forbiddance flag field 133 corresponding to the login name in the login name field 73 in the deleted user DB 7 (step S79). On this occasion, in step S77, the withdrawal determining unit 93 refers to a withdrawal forbiddance flag instead of the determination criteria (B1), (B2), and (B4) and, if the withdrawal forbiddance flag has been stored, does not permit, or forbids, the withdrawal of the reuse forbiddance on the login name.

Finally, the reuse forbiddance determining unit 25 deletes the record 51 for the user as designated in step S71 from the user DB 5 (step S81). If the answer in step S71 is NO, if the answer in step S73 is NO, and if the answer in step S77 is NO, the processing by the controller 91 proceeds to step S81.

3.2 Effects

According to the present embodiment, the reuse forbiddance withdrawal determination is performed following the reuse forbiddance determination. Consequently, the deleted user DB 7 is simplified. For instance, the last login date and time field 77, the number of printed sheets field 79, and the authority group ID field 81 may be omitted from the record 111 in the deleted user DB 7. According to the present embodiment, the reuse forbiddance withdrawal determination in step S35 of the reuse forbiddance withdrawal process in FIG. 8 is omitted.

4. Others

The present disclosure is not limited to the embodiments and modifications as above but is diversely changeable. In other words, an embodiment obtained by combining technical means that are appropriately changed within the gist of the present disclosure falls within the technical scope of the present disclosure.

The above embodiments have been described, assuming that the manager of the image forming apparatus 1, for instance, performs various operations on the image forming apparatus 1 through the operation section 11. The manager or the like may perform operations through a terminal such as a personal computer, a tablet, and a smartphone. In that case, the terminal is data-communicably connected to the communications section 9 of the image forming apparatus 1 through a data communications network such as a LAN and a telephone line. The manager or the like performs a desired operation through an input device, such as a keyboard, of the terminal. Specifically, the manager or the like can make a request for deletion to the user deletion receiving unit 23, make a request for registration of a new user to the user registration receiving unit 27, and perform a setting operation for making the reuse forbidding function effective/ineffective, for instance.

The programs, which work in the respective apparatuses of the embodiments, are programs for controlling the CPU or the like (programs causing a computer to operate) so that functions of the above embodiments may be realized. Information to be dealt with in the apparatuses is, during the processing of the information, temporarily accumulated in a temporary storage (a random access memory (RAM), for instance), then stored in various storages including a read-only memory (ROM) and a HDD, and read by the CPU as required so as to carry out correction or writing.

A recording medium for storing a program may be any of a semiconductor medium (such as a ROM and a non-volatile memory card), an optical or magneto-optical recording medium (such as a digital versatile disc (DVD), a magneto-optical disc (MO), a mini disc (MD), a compact disc (CD), and a Blue-ray (registered trademark) disc (BD)), and a magnetic recording medium (such as a magnetic tape and a flexible disc). Execution of the loaded programs not only realizes the functions of the above embodiments but may realize functions of the present disclosure as a result of processing in cooperation with an operating system or another application program based on instructions from the programs.

If the programs are to be put on the market, the programs can be stored in a portable recording medium and as such distributed, or transmitted to a server computer over a network such as the Internet. In the latter case, it is a matter of course that a storage of the server computer is incorporated into the present disclosure.

What is claimed is:

1. An image forming apparatus comprising:

a processing device; and an input device, wherein the processing device:

registers, in association with a user, a string serving as personal identification information for identifying the user, determines, in response to a reception of a request for deletion of a registered user, via the input device, based on an attribute imparted to the registered user, whether to forbid reuse of the string associated with the registered user for which the request for deletion is received, the attribute including a period of forbiddance of reuse of the personal identification information, refuses, in accordance with a result of the determination, a request for registration of the user associated with the string, withdraws the forbiddance of reuse of the personal identification information according to the personal identification information or another attribute imparted to the user associated with the personal identification information, and displays a warning message in response to a request for registration of a new user associated with the personal identification information for which the forbiddance of reuse has been withdrawn.

2. The image forming apparatus according to claim 1, wherein the attribute further includes at least one of:

a history of user identification performed based on the personal identification information, a history of an operation performed by the user identified based on the personal identification information, and a type of the personal identification information.

3. The image forming apparatus according to claim 1, wherein, if a block deletion of all registered users is requested, the processing device further permits a reuse with respect to all personal identification information associated with all the registered users.

4. The image forming apparatus according to claim 1, wherein the attribute further includes at least one of:

a history of a user identification performed based on the personal identification information, a history of an operation performed by the user identified based on the personal identification information, and a manager authority imparted to the user associated with the personal identification information.

5. A user registration method for an image forming apparatus, the user registration method comprising:

registering, in association with a user, a string serving as personal identification information for identifying the user;

determining, in response to a reception of a request for deletion of a registered user, based on an attribute imparted to the registered user, whether to forbid reuse of the string associated with the registered user for which the request for deletion is received, the attribute including a period of forbiddance of reuse of the personal identification information;

refusing, in accordance with a result of the determination, a request for registration of the user associated with the string;

withdrawing the forbiddance of reuse of the personal identification information according to the personal identification information or another attribute imparted to the user associated with the personal identification information; and displaying a warning message in response to a request for registration of a new user associated with the personal identification information for which the forbiddance of reuse has been withdrawn.

6. The image forming apparatus according to claim 1, wherein the attribute further includes on-registration authentication mode information.

7. The image forming apparatus according to claim 1, wherein the processing device further withdraws the forbiddance of reuse of the personal identification information when the period of forbiddance of reuse of the personal identification information has elapsed.

8. The image forming apparatus according to claim 1, wherein the warning message displays contents regarding the period of forbiddance of reuse of the personal identification information.

9. The image forming apparatus according to claim 1, wherein the attribute further includes a value corresponding to an operational history of the image forming apparatus, and the processing device determines, based on the value, whether to forbid the reuse of the string as a piece of the personal identification information.

* * * * *